US007768427B2

(12) United States Patent
Manor

(10) Patent No.: US 7,768,427 B2
(45) Date of Patent: Aug. 3, 2010

(54) PROCESSOR ARCHITECTURE FOR TRAFFIC SENSOR AND METHOD FOR OBTAINING AND PROCESSING TRAFFIC DATA USING SAME

(75) Inventor: Dan Manor, Ontario (CA)

(73) Assignee: Image Sensign Systems, Inc., St. Paul, MN (US)

( * ) Notice: Subject to any disclaimer, the term of this patent is extended or adjusted under 35 U.S.C. 154(b) by 1398 days.

(21) Appl. No.: 11/197,456

(22) Filed: Aug. 5, 2005

(65) Prior Publication Data

US 2007/0030170 A1 Feb. 8, 2007

(51) Int. Cl.
*G08G 1/01* (2006.01)
(52) U.S. Cl. .................. 340/933; 340/905; 340/904; 340/907; 340/910; 340/916; 340/917; 340/924; 701/36; 701/96; 701/117; 701/302
(58) Field of Classification Search .......... 340/933, 340/905, 902, 904, 907, 909, 910, 916, 917, 340/924; 701/36, 96, 117, 302
See application file for complete search history.

(56) References Cited

U.S. PATENT DOCUMENTS

| | | | |
|---|---|---|---|
| 4,967,201 A | 10/1990 | Rich, III | |
| 4,977,406 A | 12/1990 | Tsukamoto et al. | |
| 5,161,107 A | 11/1992 | Mayeaux et al. | |
| 5,402,346 A | 3/1995 | Lion et al. | |
| 5,423,080 A | 6/1995 | Perret et al. | |
| 5,554,983 A * | 9/1996 | Kitamura et al. | 340/937 |
| 5,590,217 A * | 12/1996 | Toyama | 382/104 |
| 5,621,645 A | 4/1997 | Brady | |
| 5,663,720 A | 9/1997 | Weissman | |
| 5,694,134 A | 12/1997 | Barnes | |
| 5,793,491 A | 8/1998 | Wangler et al. | |
| 5,798,983 A | 8/1998 | Kuhn et al. | |
| 5,878,367 A | 3/1999 | Lee et al. | |
| 5,884,212 A | 3/1999 | Lion | |
| 5,920,280 A | 7/1999 | Okada et al. | |
| 5,949,383 A | 9/1999 | Hayes et al. | |

(Continued)

OTHER PUBLICATIONS

RTMS User Manual Issue 3.2 by EIS, describing the configuration of a traffic sensor currently in production by EIS—TRMS model X3—Publication date Apr. 2004.

(Continued)

*Primary Examiner*—Daryl Pope
(74) *Attorney, Agent, or Firm*—Bereskin & Parr LLP/S.E.N.C.R.L., s.r.l.

(57) ABSTRACT

Vehicular traffic data is obtained using a traffic sensor having an antenna/transceiver module, a DSP and a microcomputer. This involves (a) transmitting radiation at a vehicles on a roadway; (b) receiving the radiation reflected back from the vehicles; (c) producing a stream of electrical signals based on the radiation reflected back from the vehicles; (d) processing the stream of electrical signals using the DSP to determine if a vehicle detection threshold is met, and, if the vehicle detection threshold is met, to determine an initial vehicle position; (e) when the vehicle detection threshold is met, generating a first signal representing the initial vehicle position using the DSP; (f) transmitting the first signal to the microcomputer; (g) deriving a first traffic information signal from the first signal using the microcomputer; (h) transmitting the first traffic information signal to an external traffic management system.

20 Claims, 5 Drawing Sheets

U.S. PATENT DOCUMENTS

| | | | |
|---|---|---|---|
| 6,114,973 | A | 9/2000 | Winner et al. |
| 6,556,916 | B2 | 4/2003 | Waite et al. |
| 6,577,269 | B2 | 6/2003 | Woodington et al. |
| 6,693,557 | B2 | 2/2004 | Arnold et al. |
| 6,750,787 | B2 | 6/2004 | Hutchinson |
| 6,911,918 | B2 * | 6/2005 | Chen ............... 340/995.13 |
| 7,085,633 | B2 * | 8/2006 | Nishira et al. ............ 701/36 |
| 7,110,880 | B2 * | 9/2006 | Breed et al. ............ 701/207 |
| 7,145,475 | B2 * | 12/2006 | Kavner ................ 340/933 |
| 7,176,813 | B2 * | 2/2007 | Kawamata et al. .... 340/995.13 |

OTHER PUBLICATIONS

A Photo Showing the RTMS model X3 from inside—Release date Sep. 2003.

SmarTek Acoustic Sensor Version 1 Installation and Setup Guide Jul. 25, 2000.

RTMS User Manual Issue 3.2 by EIS, describing the automatic set up and lane configuration pp. 9-13—Publication date Apr. 2004.

Berka S., Kent Lall B. and Fellow, ASCR: "New Perspectives for ATMS: Advanced Technologies in Traffic Detection"—Journal of Transportation Engineering, Jan./Feb. 1998.

Kim I.S., Jeong K., Kwon Jeong J.: "Two Novel Radar Vehicle Detectors for the Replacement of a Conventional Loop Detector"—Microwave Journal, vol. 44, No. 7, Jul. 2001, pp. 22, 26-28, 32, 35, 38, 40.

Krämer G.: "Envisioning a Radar-Based Automatic Road Transportation System"—Intelligent Transportation Systems, May/Jun. 2001, pp. 75-77.

Dailey D.J.: "A Statistical Algorithm for Estimating Speed from Single Loop Volume and Occupancy Measurements", Transportation Research Board, Part B33 (1999), pp. 133-136.

Stewart B.D., Reading I., Thomson, M.S., Binnie T.D., Dickinson K.W., Wan C.L.: "Adaptive Lane Finding In Road Traffic Image Analysis"—Road Traffic Monitoring and Control, Apr. 26-28, 1994, Conference Publication No. 391, IEE, 1994.

Smith R.L., Arnold D.V.; "Development of a Low Cost, FM/CW Transmitter for Remote Sensing"—Vehicle Detector Workshop TexITE Jun. 2000.

Unknown; "RTMS Radar Traffic Detection—General Information", EIS Integrated Sysems Inc., Jul. 21, 2001, pp. 1-6.

Ma B., Lakshmanan S., Hero A.; "Road and Lane Edge Detection with Multisensor Fusion Methods"—0-7803-5467-2/99 1999 IEEE.

Gern A., Franke U.; "Advanced Lane Recognition—Fusing Vision and Radar"—Proceedings of the IEEE Intelligent Vehicles Symposium 2000, Oct. 3-5, 2000, pp. 45-51.

Gonzalez J.P., Ozguner, U.; "Lane Detection Using Histogram-Based Segmentation and Decision Trees"—2000 IEEE Intelligent Transportation System Conference Proceedings, Oct. 1-3, 2000, pp. 346-351.

Unknown; "Task Force L Final Report"—Executive Summary, pp. 1-40, Jan. 16, 2002.

Unknown; "Sensors"—Transportation Operations Group, Vehicle Detection Workshop, Tex/TE Jun. 2000, pp. 1 of 13, 2 of 13, 11, 12.

Unknown; "RTMS Traffic Detector Primer"—EIS Electronic Integrated Systems Inc. Jul. 21, 2001, pp. 1-4.

Beard J.C. and Arnold D.V.; "6GHz Range Finder Using Pulse Compression"—IGARSS 2000.

Derneryd A.G.; "Linearly Polarized Microstrip Antennas"—IEEE Transactions on Antennas and Propagation, Nov. 1976, pp. 846-851.

Kranig J., Minge, E. Jones C.; "Field Test of Monitoring of Urban Vehicle Operations Using Non-Intrusive Technologies"—Final Report—FHWA-PL-97-018, Part IV—Department of Transportation Federal Highway Administration, May 1997.

Middleton D. and Parker R.; "Initial Evaluation of Selected Detectors to Replace Inductive Loops on Freeways"—Report 1439-7—Apr. 2000.

Unknown; "Detection Technology: for IVHS—vol. 1: Final Report Addendum" Publication No. FHWA-RD-96-100, Publication Date: Jul. 1995 (§ 12).

SmarTek Acoustic Sensor—Version 1 (SAS-1)—Installation and Setup Guide, Jul. 25, 2005.

Unknown: "On-Bench Photographs of Detectors"—pp. 1-9, Jan. 16, 2002.

* cited by examiner

PROCESSOR ARCHITECTURE FOR TRAFFIC SENSOR AND METHOD FOR OBTAINING AND PROCESSING TRAFFIC DATA USING SAME

FIELD OF THE INVENTION

This invention relates to a traffic sensor, and method of using same, and more specifically relates to a processor architecture for a traffic sensor.

BACKGROUND OF THE INVENTION

As urban centers increase in size, and traffic congestion becomes more common, the need for accurate and up-to-date traffic information also increases. Traffic surveillance relies primarily on traffic sensors, such as inductive loop traffic sensors that are installed under the pavement. Alternatively, video sensors may also be used to obtain traffic information.

Residing underground, inductive loop sensors are expensive to install, replace and repair because of the associated roadwork required. Moreover, such roadwork also causes traffic disruptions. Video sensors, on the other hand, are cheaper, but have other drawbacks, such as an inability to operate in the dark or in weather that impairs visibility, such as fog or snow.

To overcome these drawbacks, radar sensors have been employed to obtain traffic information. Radar sensors typically transmit low-power microwave signals at the traffic, and detect vehicles based on the reflected signals. Radar sensors are generally cheaper than inductive loop traffic sensors, and, unlike video sensors, operate well in the dark and in a wide range of weather conditions.

Some processing of the reflected signals takes place in the radar sensor itself, and then this information is typically communicated to an external traffic management system. For example, some prior sensors include a single DSP processor that performs all of the computational functions required by the traffic sensor. Alternatively, in other prior radar sensors, the processing functions of the radar sensor are divided between a DSP processor which processes a stream of electrical signals from a receiving antenna of the radar sensor, and a microcomputer for processing the stream of digital signals received from the DSP. In this processor architecture according to the prior art, the DSP would perform raw signal processing on the reflected signals received from the receiving antenna, while the microcomputer would determine if a vehicle was present.

SUMMARY OF THE INVENTION

In accordance with an aspect of the invention, there is provided a method for obtaining vehicular traffic data using a traffic sensor having an antenna/transceiver module, a DSP and a microcomputer. The method comprises (a) transmitting radiation at a vehicles on a roadway; (b) receiving the radiation reflected back from the vehicles; (c) producing a stream of electrical signals based on the radiation reflected back from the vehicles; (d) processing the stream of electrical signals using the DSP to determine if a vehicle detection threshold is met, and, if the vehicle detection threshold is met, to determine an initial vehicle position; (e) when the vehicle detection threshold is met, generating a first signal representing the initial vehicle position using the DSP; (f) transmitting the first signal to the microcomputer; (g) deriving a first traffic information signal from the first signal using the microcomputer; (h) transmitting the first traffic information signal to an external traffic management system.

In accordance with a second aspect of the invention, there is provided a sensor for obtaining vehicular traffic data. The sensor comprises: (a) an antenna/transceiver module for transmitting microwave radiation at a vehicle passing the sensor and for receiving the microwave radiation reflected back from the vehicle, and for producing a stream of electrical signals based on the microwave radiation reflected back from the vehicle; (b) a DSP for processing the stream of electrical signals, the DSP having a vehicle detection function for determining a vehicle detection if a vehicle detection threshold is met and for determining a vehicle position, and a signal generation function for generating a first signal representing the vehicle detection and the vehicle position, the signal generation function being linked to the vehicle detection function for communication therewith; and, (c) a microcomputer for receiving and processing the first signal to derive a first traffic information signal for transmission to an external traffic management system, the microcomputer being electronically coupled to the DSP and having a communication function for electronic communication with an external traffic management system.

BRIEF DESCRIPTION OF THE DRAWINGS

A detailed description of the preferred embodiments is provided herein below with reference to the following drawings, in which.

DETAILED DESCRIPTION OF EMBODIMENTS OF THE INVENTION

Figure 1:
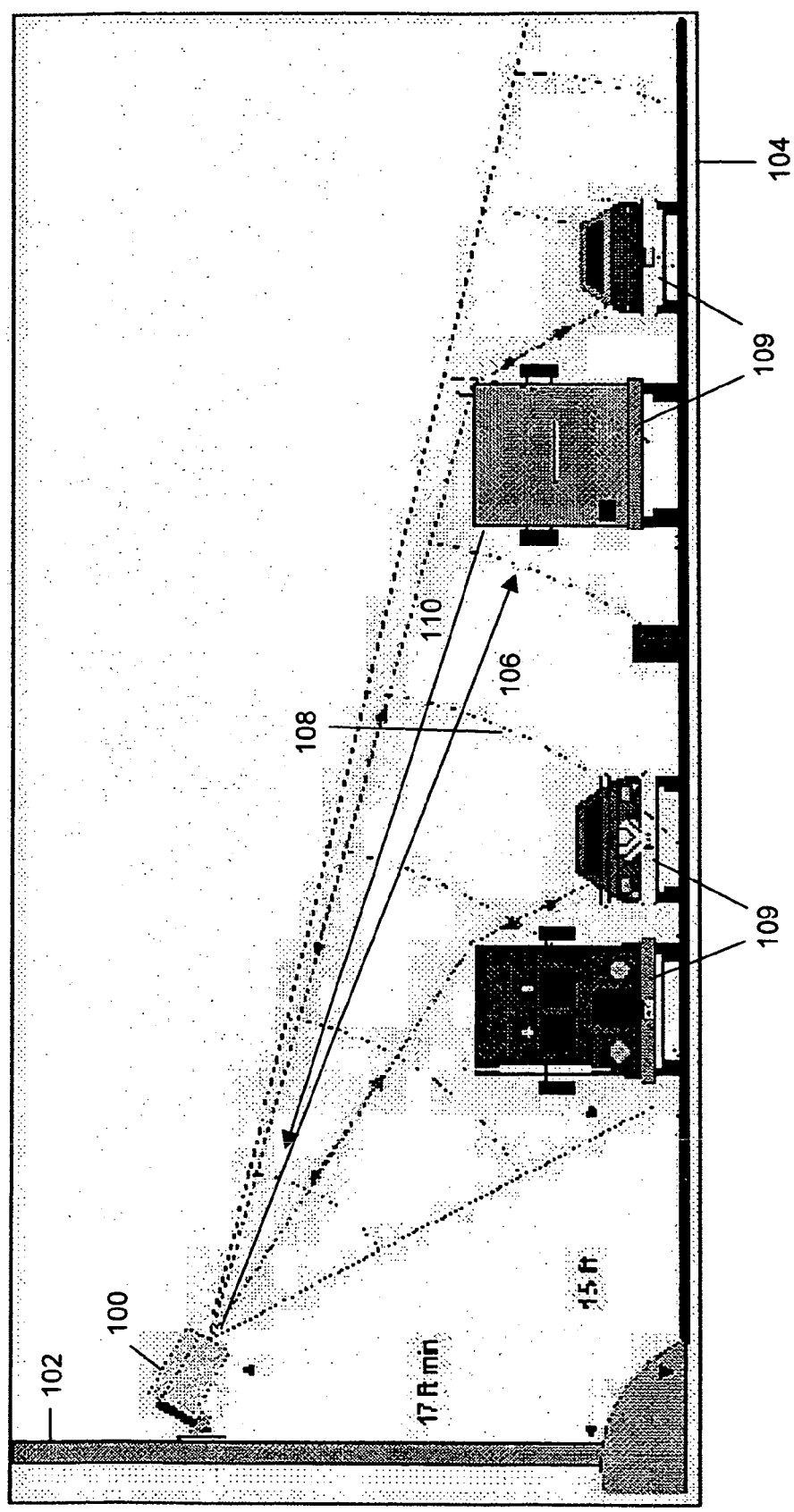
FIG. 1, in a schematic view, illustrates a traffic sensor in accordance with an aspect of the present invention.

Referring to FIG. 1, there is illustrated in a schematic view, a sensor 100 in accordance with a preferred aspect of the present invention. The sensor 100 is mounted on a pole 102 in a side-mounted configuration relative to road 104. Sensor 100 transmits a signal 106 through a field of view 108 at the road 104 to "paint" a long elliptical footprint on the road 104. Any non-background targets, such as vehicles 109, reflect a reflected signal Pr 110 having power level P. Specifically, the low-power microwave signal 106 transmitted by sensor 100 has a constantly varying frequency. Based on the frequency of the reflected signal 110, the sensor can determine when the original signal was transmitted, thereby determining the time elapsed and the range to the reflecting object. The range of this reflected object is the "r" in Pr.

Figure 2:
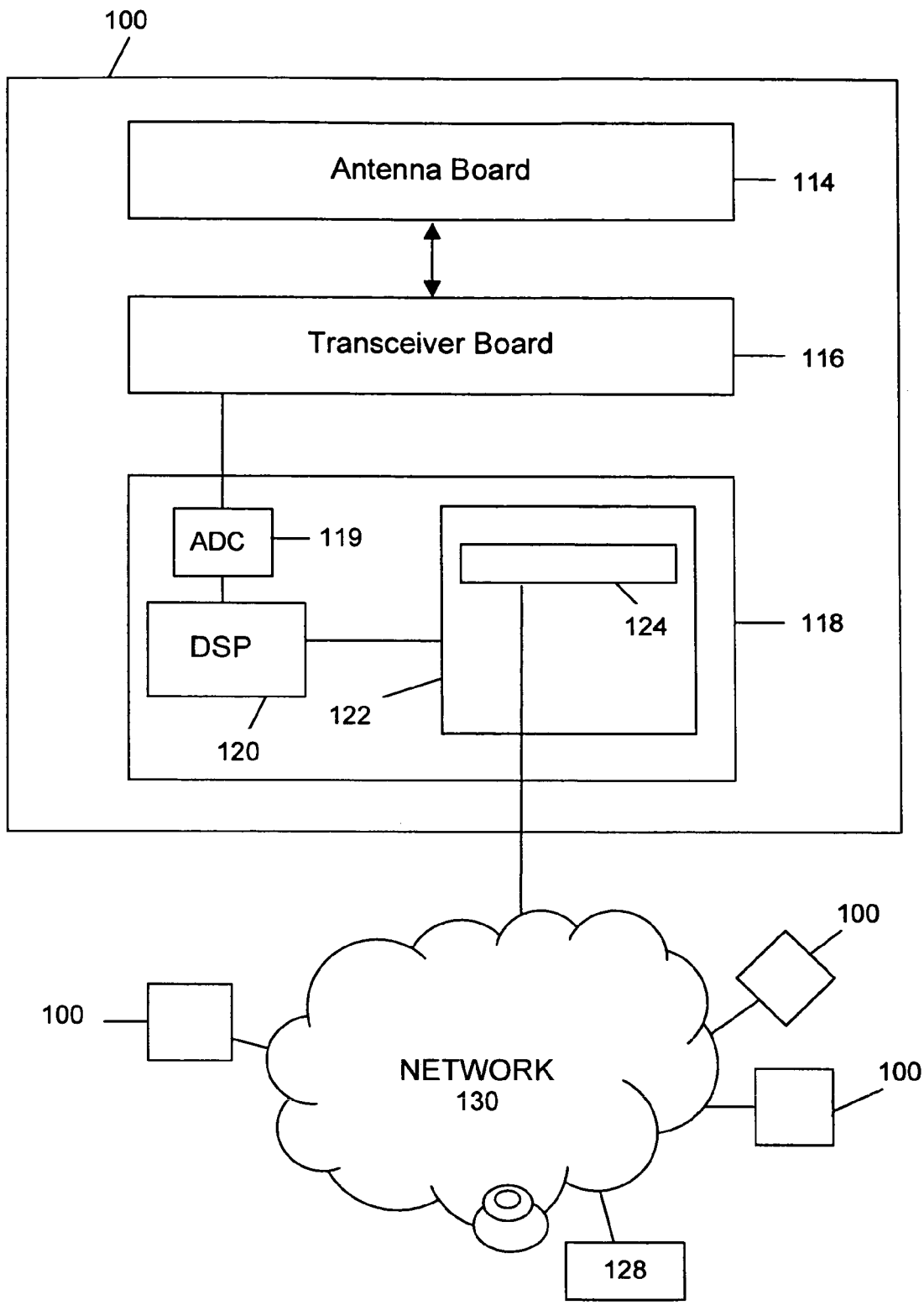
FIG. 2, in a block diagram, illustrates the traffic sensor of FIG. 1.

Referring to FIG. 2, the components of the sensor 100 are illustrated in a block diagram. As shown, the sensor 100 comprises an antenna board 114 for transmitting the signal 106 through field of view 108, and for receiving the reflected signal 110 back from the roadway. A transceiver board 116 is in electronic communication with, and drives, antenna board 114. Transceiver board 116 also receives the reflected signals from the antenna board 114, and transmits this information to a processor module 118. Preferably, processor module 118 comprises an Analog to Digital Converter (ADC) 119, a digital signal processor (DSP) chip 120 and a separate microcomputer chip 122. This microcomputer chip 122 in turn comprises an internal, non-volatile memory 124. In operation, the ADC 119 digitizes the reflected signal at specific sample times, and the DSP chip 120, which is a high-speed chip, does the raw signal processing of the digitized electrical signals received from the transceiver board 116. That is, the DSP chip 120 preferably determines if a vehicle is present by determining if the stream of electrical signals received from the transceiver board 116 meets a vehicle detection criterion. The DSP chip 120 also preferably determines the range of the vehicle from the sensor. This information is then sent to the microcomputer chip 122, which configures this data for transmission to external traffic management system 128 via network 130. Microcomputer chip 122 may also collate aggregate traffic density information from this information. Typically, sensor 100 will be just one of many sensors as illustrated in FIG. 2, which are connected to external traffic management system 128 via network 130.

Figure 3:
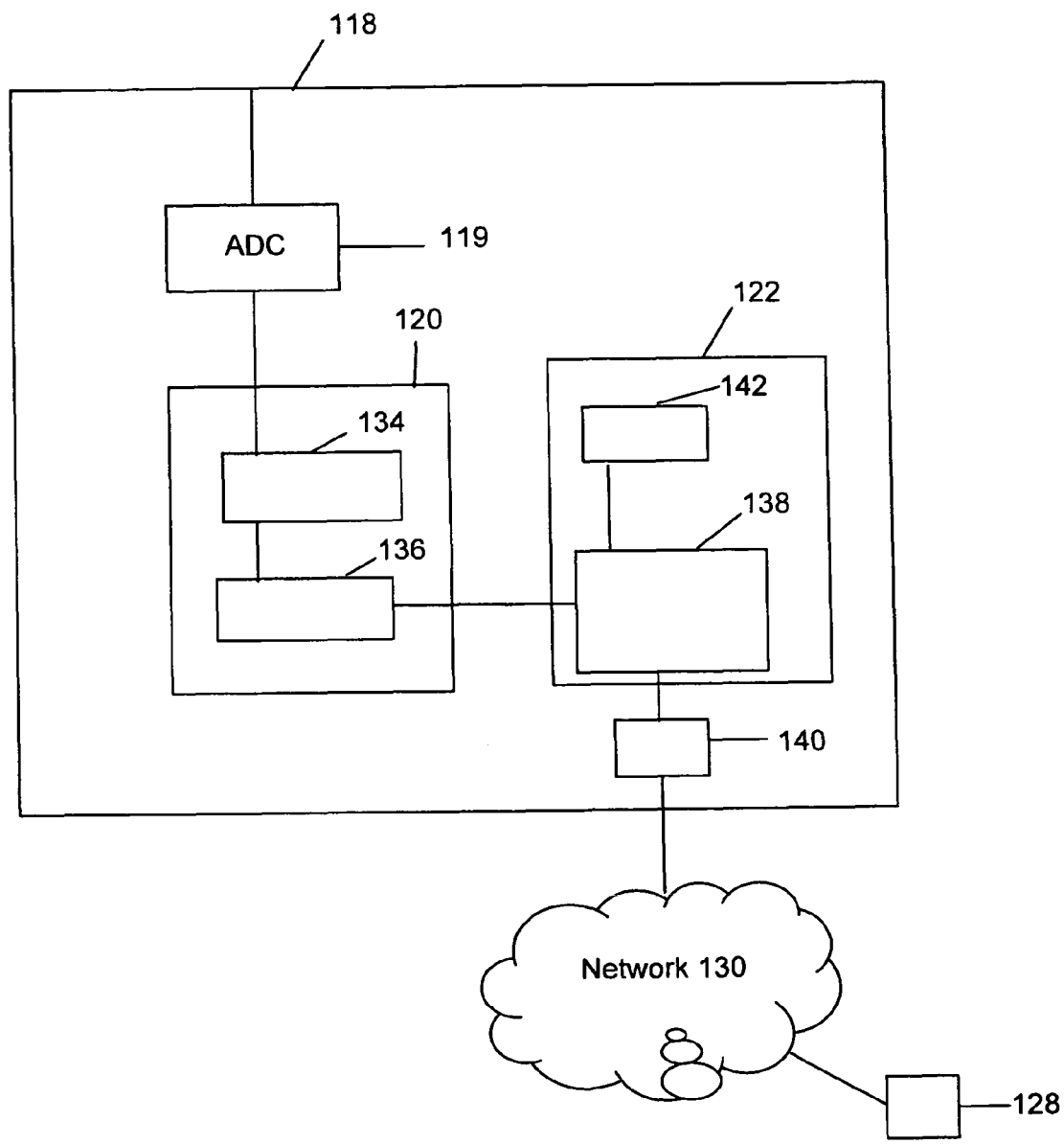
FIG. 3, in a block diagram, illustrates a processor module of the traffic sensor of FIG. 1.

Referring to FIG. 3, the processor module 118 in FIG. 2 is illustrated in more detail. As shown, the DSP 120 comprises a vehicle detection function 134 and a signal generation function 136. The vehicle detection function 134 determines if a vehicle is present by determining if the stream of electrical signals received from the transceiver board 116 via ADC 119 meets a vehicle detection criteria. In addition to this detection of vehicles, the vehicle function 134 may also automatically determine lane centers, as well as determining deviation from previously defined zone centers by current traffic and re-defining these zone centers to correct for this deviation. Alternatively, zone centers or lane centers may be manually calibrated.

The vehicle detection function 134 may detect vehicles in different ways. For illustrative purposes, a particular approach to detecting vehicles is described below. However, other approaches may also be used. For example, lane centers may be defined manually and then redefined as required.

The reflected signals Pr described above in connection with FIG. 1 are generated in real-time such as, for example without limitation, every 1 mS. As described above, each reflected signal Pr has power level <P> and range <r>. Specifically, the elliptical footprint projected onto the road 104 by signal 106 is divided up into uslice ranges <r> each of which uslices is at a different distance from the sensor. The thickness of these uslices is selected such that several uslices are required to span the width of a single lane. For example without limitation, each uslice range can be about 40 cm thick, although this may change depending on the resolution of the sensor 100.

To first detect the vehicles and then determine lane centers, the processor module 118 may maintain the following data structures:

Zi is the range (in uslices) of tentative zone number i

ΣΔi is the sum of errors of zone Zi

Ai is the sum of activities of zone Zi

Ti is a time-out counter, which is incremented by one every 1 mS.

Fi is a Boolean flag indicating, when Fi=1, that zone Zi is on an active lane.

In the above data structure, i represents the particular zone center of a data structure. For example, without limitation, i may be any integer in the range of 1 to 16 inclusive, 16 being the maximum number of zone centers. Alternatively, some other maximum number of zone centers may be used.

Ai represents the sum of activities, which is defined for a particular vehicle, instead of being defined for a plurality of vehicles. That is, Ai is incremented for every reflected signal Pr received during a vehicle's passage through the footprint provided that the reflected signal Pr is received within the range r=Zi preceding, for example without limitation, a 100 mS gap interval during which no reflected signal Pr is received from that lane. A time-out counter Ti is also provided. The 100 mS interval is measured by time-out counter Ti, which is incremented by 1 every 1 mS. Of course, time-out intervals other than 100 mS may be used.

Initially, no uslices are designated as preliminary zones centers: thus, Zi=0; Fi=0; ΣΔi=0; and, Ai=0 for i=1 to 16. For a suitable time interval, such as 1 minute or so, data is collected in the 32 counters associated with zone centers that are dynamically defined. That is, for every reflected signal sample Pr, the processor module 118 checks whether there is a previously defined zone center Zi where ABS(Zi−r)<some selected maximum distance, such as, for example without limitation, 7 uslices. If there is no previously defined zone center that satisfies this inequality, than a new tentative zone center is defined as Zi=r. The corresponding activity counter Ai for this zone center is then set; Ai=1. Similarly its timer Ti is set; Ti=0.

On the other hand, if there is at least one previously defined zone center Zi that is sufficiently close to the uslice range r such that the ABS(Zi−r)<7, then this nearest zone center Zn is associated with Pr.

In cases where a previously defined zone center is associated with Pr, then the range deviation, r−Zn, for this signal is added to the sum of errors for that zone center, and An and Tn adjusted, as follows:

$$\Sigma\Delta n = \Sigma\Delta n + (r-Zn); An=An+1; Tn=0$$

By this means, Ai counts the number of valid signals associated with zone centers Zi, while ΣΔi (represented as ΣΔn in the above equation) represents the sum of the signed errors (deviations of the signal uslice from Zi). Ti, which is the time counter, will typically have low counts during a burst arising from a passing vehicle, as Ti will be reset to zero each time a reflected signal Pr is received close to Zi. The Ti counter for each zone center Zi is checked against a fixed time-out KT=100 periodically; preferably, every one millisecond. For example without limitation, KT may be set equal to 100. If Ti>KT, indicating that there has been no activity in Zi for KT milliseconds, then, if Ai<some selected minimum activity level KA, Ai, ΣΔi and Ti are all set equal to zero. For example without limitation, KA can equal 100. In other words, if there has not been enough activity near to a zone center before there is a gap of KT (in this case 100 mS) in which no further reflected signals are received, then whatever reflected signals Pr have been received are assumed to not have resulted from vehicles, but from some other temporary obstruction that reflected the signal 106. On the other hand, if, when Ti is greater than KT, Ai is greater than KA, than a vehicle is assumed to have passed, and Zi is corrected or updated according to the formula Zi=Zi+(ΣΔi/Ai). In other words, the average error in the ΣΔi is used to shift the zone centers to where activity is centered. Subsequently, the Boolean counter Fi is set equal to 1, Ai is set equal to zero, ΣΔi is set equal to zero and Ti is set equal to zero. At the end of the collection period, only those zones that have been center-corrected based on a significant burst of activity (at least one vehicle), in which there have been no long time-out gaps—long, in this case, being time-out gaps greater than 100 mS—will have a positive Fi indicating that they are on active traffic lanes.

After this initial minute or so of course tuning, the zone centers $Z_i$ can continue to be adjusted in the matter described above. However, during this fine tuning phase, if there is no previously defined zone center $Z_i$ such that $ABS(Z_i-r)<$than, for example, 7 uslices, then that reflected signal Pr will simply be dropped, and will not be used to adjust the zone center $Z_i$ The vehicle detection function is also operable to determine the duration of the vehicle passing the sensor, and the centricity of the vehicle relative to the center of the lane. The duration of the vehicle passing the sensor—that is the length of time that the vehicle passing the sensor remains within the elliptical footprint projected onto the road 104—can be determined from $A_i$ once $T_i$ is greater than KT. That is, if $T_i$ exceeds KT then this indicates that the vehicle is no longer inside the elliptical footprint projected onto the road 104. At that point, $A_i$ will approximately represent the number of signals reflected from the vehicle, and given that the signals are transmitted to the vehicle at a known rate, enables the duration of the vehicle within the elliptical footprint to be determined.

Similarly, the centricity of the vehicle can be determined by determining the standard deviation of the ranges of all of the reflected signals Pr reflected from the vehicle. This standard deviation will be based upon the zone center $Z_i$ ultimately determined as described above.

Of course, vehicle detection function 134 will only determine the duration and centricity of a vehicle leaving the elliptical footprint where a vehicle has actually been determined to be in the elliptical footprint. Thus, as described above, $A_i$ must be greater than KA before there is a gap of KT milliseconds. Provided this vehicle detection threshold has been met, then the beginning of the KT milliseconds will signify the end of the vehicle passing the sensor. The vehicle detection function also detects this end of the vehicle.

The vehicle detection function 134 communicates the initial detection of the vehicle, the detection of the end of the vehicle, the duration of the vehicle passing the sensor, and the centricity of the vehicle relative to a center of a vehicle lane, to the signal generation function 136. The signal generation function 136 generates a first signal representing the detection of the vehicle as well as the initial position of the vehicle detected (which may be corrected or refined based on subsequent reflected signals received back from the vehicle after vehicle detection has taken place. This first signal is sent to the microcomputer 122. The internal memory 124 of the microcomputer 122 is configured to provide within the microcomputer 122 a communication function 138 for communication with external traffic management system 128 via a communication port 140. When the first signal is received by the microcomputer 122 from the signal generation function 136 of the DSP 120, the communication function 138 generates a first traffic information signal, which is transmitted to the external traffic management system 128 via communication port 140. This first traffic information signal may be transmitted to the external traffic management system 128 while the vehicle is still in the elliptical footprint provided by the sensor 100, such that the external traffic management system learns of the presence of the vehicle in real time.

At the same time as the microcomputer 122 is communicating the traffic information signal to the external traffic management system 128, the vehicle protection function 134 of the DSP 120 continues to process the stream of electrical signals representing the reflected signals Pr received by the sensor 100. From these signals, the vehicle detection function 134 determines when the end of the vehicle passes the sensor 100. The vehicle detection function 134 then communicates this information to the signal generation function 136, and the signal generation function 136 then generates a second signal based on this information and communicates this second signal to the microcomputer 122. The communication function 138 then derives a second traffic information signal from this second signal and transmits this second traffic information signal to the external traffic management system 128 via communication port 140 such that the external management 128 can be informed of the vehicles passing the sensor in real time.

Optionally, the duration of the vehicle passing the sensor and the centricity of the vehicle passing the sensor relative to a vehicle lane, may also be communicated by the vehicle detection function 134 to the signal generation function 136 to be included in the second signal sent to the microcomputer 122. Alternatively, at least some of this information may be subsequently determined by the vehicle detection function 134 and subsequently communicated to the signal generation function 136, and from there to the microcomputer 122, for subsequent analysis and possibly transmission to the external traffic management system 128.

In addition to the communications function 138, the internal memory 124 of microcomputer 122 is also configured to provide a data compilation function 142. This data compilation function collects aggregate vehicle data sent from the DSP for a plurality of vehicles and derives aggregate statistics such as traffic flow patterns and total road usage. This aggregate data can then be sent to the communications function 138, where it is suitably configured for transmission over network 130 to the external traffic management system 128. Typically, such as where the network 130 is the Internet, the communication function 138 will configure the aggregate vehicle data for transmission over the network by providing a destination network protocol address for routing the vehicle data. Preferably, the aggregate vehicle data is also configured according to the National Transportation Communications for ITS Protocol.

By having a processor architecture that is split up between the DSP 120 and the microcomputer 122, the processor module 118 can allocate different kinds of processing—each with its own complexity and real-time urgency—to that type of processor that can most efficiently do the processing. That is, DSPs are designed for the real-time processing of a stream of signal samples at very high speeds while carrying out highly repetitive processing functions at high accuracy. Examples of functions typically performed by a DSP would include radar signal processing, voice recognition and music synthesis. DSPs are typified by high-speed arithmetic units with clock speeds of 100 MHz or higher, capable of high precision (24-64 bits), and simultaneous parallel execution of several operations. DSPs typically have a wide data bus for parallel processing. On the downside, DSPs have limited input/output capability, and limited internal memory for programming and for the storage of data.

Microcomputers are also sometimes characterized as "single-chip" computers. Microcomputers combine on-chip processing, program and data memory as well as a wide variety of input/output functions. Typically, microcomputers compromise on data accuracy which is typically 8-16 bits and are significantly slower in performing programs (clock rates of 30 MHz), yet are versatile enough to perform non-demanding real time embedded applications such as data communications protocol. They have the further advantage of consuming less power.

Figure 4:
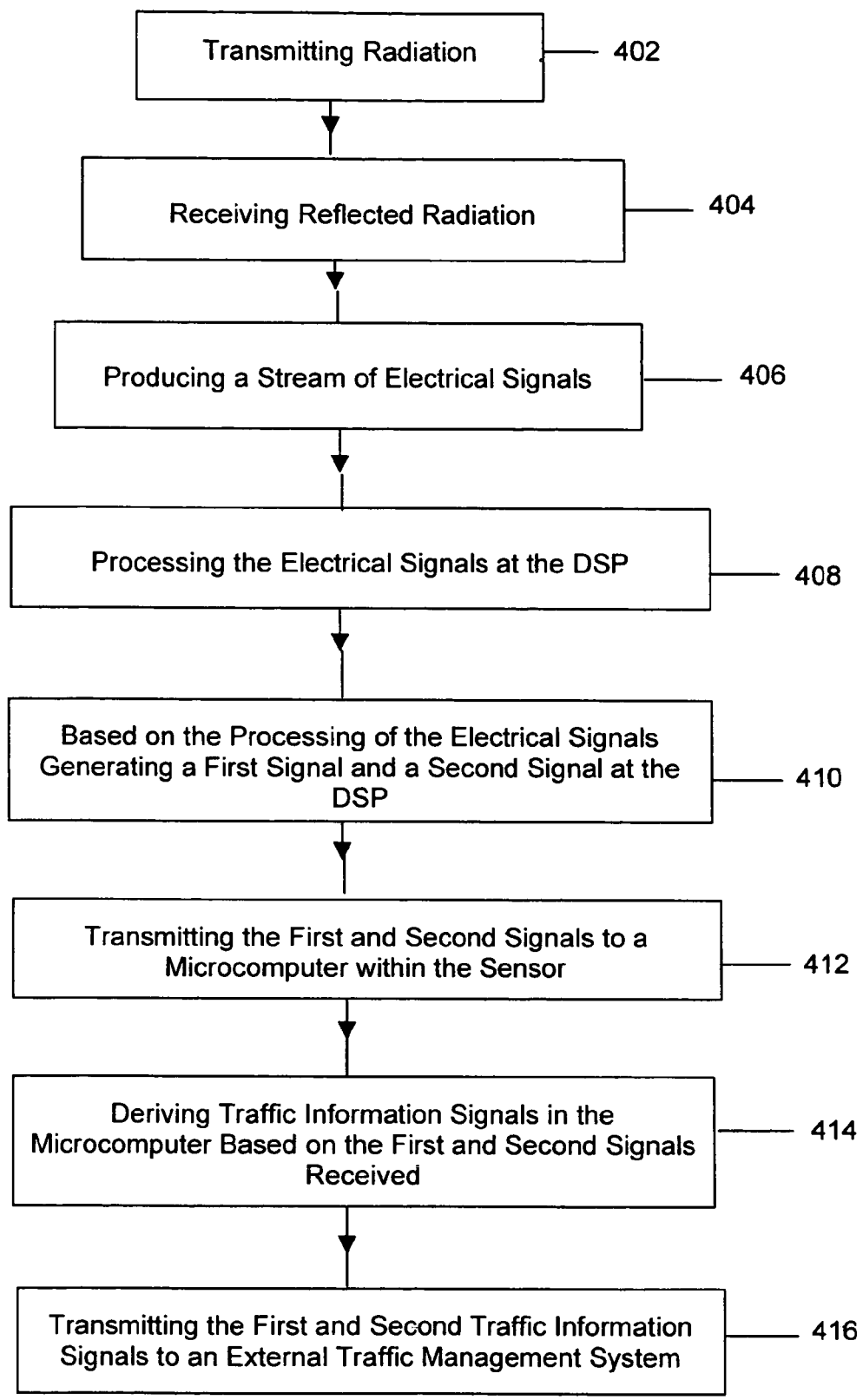
FIG. 4, in a flow chart, illustrates a method of processing traffic data in accordance with an aspect of the present invention; and, FIG. 5, in a flowchart, illustrates a further method of processing traffic data at a microcomputer within a sensor in accordance with a yet further aspect of the present invention.

Referring to FIG. 4, there is provided a flow chart illustrating a method of obtaining vehicular traffic data using a traffic sensor having an antenna/transceiver module, a DSP and a microcomputer in accordance with an aspect of the invention.

According to the method, processing functions are split up between the DSP and microcomputer.

In step 402 of the method of FIG. 4, radiation is transmitted at a vehicle. In step 404, radiation reflected back from the vehicle is received. In step 406 a stream of electrical signals are produced by the transceiver module and are digitized by an ADC, based on the radiation reflected back from the vehicle.

In step 408, the stream of electrical signals produced in step 406 are processed using the DSP to determine if a vehicle detection threshold is met as described above. If the vehicle detection threshold is met, then the DSP also processes the stream of electrical signals to determine an initial vehicle position.

If the vehicle detection threshold is met in step 408, then the method proceeds to step 410 in which a first signal representing the initial vehicle position is generated using the DSP. Alternatively, if the vehicle detection threshold is not met in step 408, then no signal is generated and step 410, as well as subsequent steps in the method of FIG. 4 are not executed.

In step 412, the first signal generated in step 410 is transmitted to the microcomputer within the sensor. Then, in step 414 the microcomputer derives a first traffic information signal from the first signal. This first traffic information signal is transmitted to an external traffic management system in step 416.

According to a preferred aspect of the invention, steps 410, 412, 414 and 416 involve additional information and signals. That is, after the stream of electrical signals ends, a second signal is preferably derived from the stream of electrical signals using the DSP. Step 412 then additionally comprises transmitting this second signal to the microcomputer and step 414 additionally comprises deriving a second traffic information signal from this second signal using the microcomputer. In step 416, this second traffic information signal is transmitted to the external traffic management system. Preferably, the first signal, first traffic information signal, second signal, and second traffic information signal are all generated and transmitted in real time. Thus, the first signal may be transmitted and received by the microcomputer and a first traffic information signal derived and transmitted to the external traffic management system, before the stream of electrical signals ends and the second signal is generated in step 410. By this means, the external traffic management system will learn of the vehicle passing through the sensor even before the vehicle has left the elliptical footprint projected by the sensor on the road.

The initial vehicle position determined in step 408 may, based on information received after the initial portion of the stream of electrical signals has been used to generate the first signal, require correction. Accordingly, the final vehicle position is preferably determined in step 410 using the entire stream of electrical signals. The second signal may include this final vehicle position. Similarly, the DSP may determine the duration that the vehicle is within the elliptical footprint in front of the sensor as well as the centricity of the vehicle relative to a centre of the vehicle lane containing the vehicle in step 408. The second signal may also include this duration and vehicle centricity information.

One of the advantages of splitting up the processing between a DSP and a microcomputer is that steps 408 and 410, which involve considerable arithmetic processing, are performed by the DSP at a first clock speed while steps 412 and 414, which are less demanding in terms of processing, can be performed by the microcomputer at a second clock speed that is much slower than the first clock speed.

Figure 5:
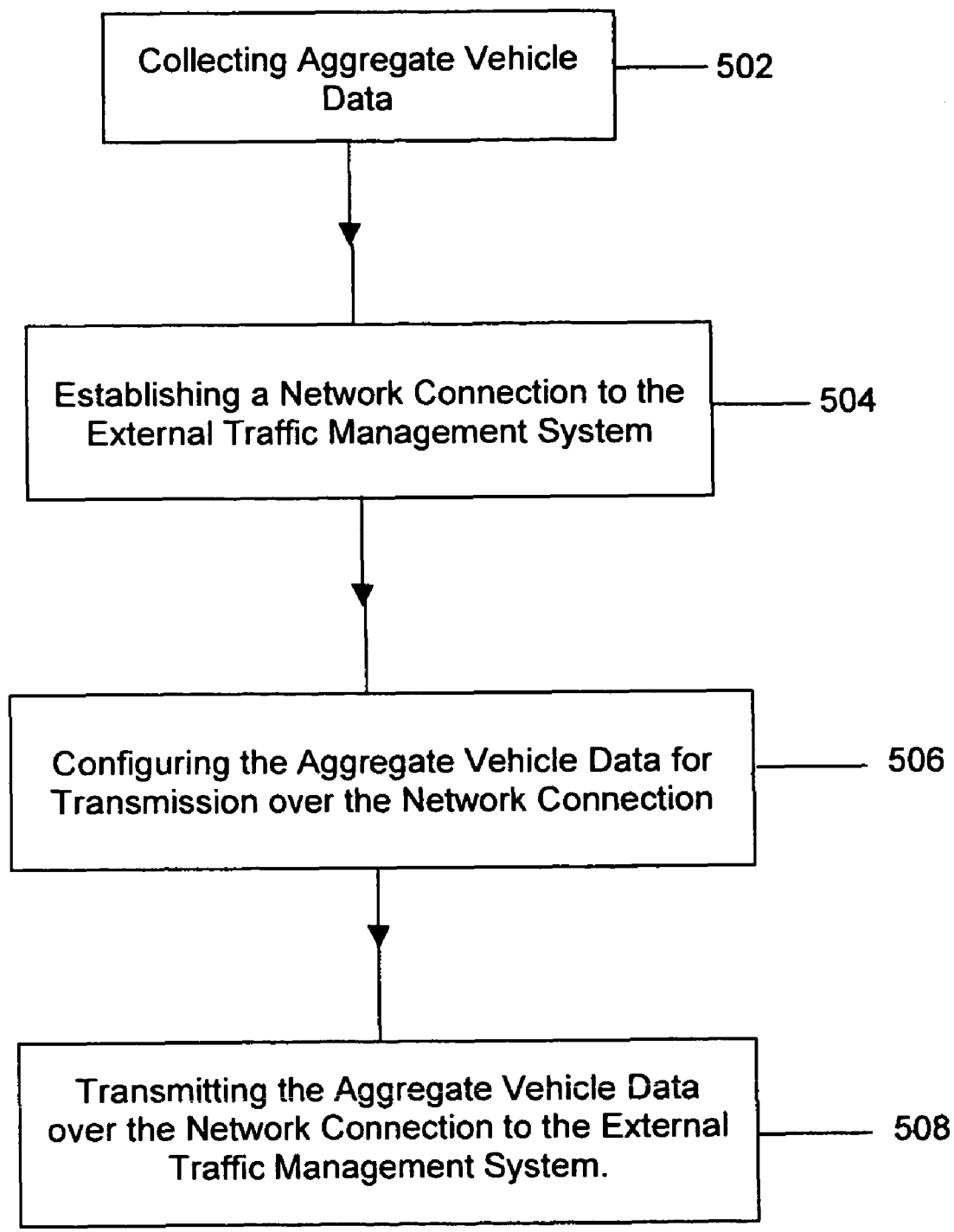

Referring to FIG. 5, an additional processing method executed by the microprocessor is illustrated in a flow chart. In step 502 aggregate vehicle data from a plurality of first signals and a plurality of second signals generated for a plurality of vehicles are collected and stored in an internal memory of the microcomputer. At a convenient time, when other processing demands are not being placed on the microcomputer and after a significant amount of aggregate vehicle data has been collected, or upon a specific request from the external traffic management system, the microcomputer can establish a network connection to the external traffic management system in step 504. Then, in step 506, the aggregate vehicle data will be configured for transmission over the network connection. Typically, step 506 will comprise configuring the aggregate vehicle data for transmission over the network connection by providing a destination network protocol address for routing the aggregate vehicle data. Preferably, this aggregate vehicle data is configured according to National Transportation Communications for ITS Protocol. In step 508, the configured aggregate vehicle data is transmitted over the network connection to the external traffic management system.

Other variations and modifications of the invention are possible. All such modifications or variations are believed to be within the sphere and scope of the invention as defined by the claims appended hereto.

The invention claimed is:

1. A method for obtaining vehicular traffic data using a traffic sensor having an antenna/transceiver module, a DSP and a microcomputer, the method comprising:
   (a) transmitting radiation at vehicles on a roadway;
   (b) receiving the radiation reflected back from the vehicles;
   (c) producing a stream of electrical signals based on the radiation reflected back from the vehicles;
   (d) processing the stream of electrical signals using the DSP to determine if a vehicle detection threshold is met, and, if the vehicle detection threshold is met, to determine an initial vehicle position;
   (e) when the vehicle detection threshold is met, generating a first signal representing the initial vehicle position using the DSP;
   (f) transmitting the first signal to the microcomputer
   (g) deriving a first traffic information signal from the first signal using the microcomputer;
   (h) transmitting the first traffic information signal to an external traffic management system.

2. The method as defined in claim 1 wherein
   step (e) comprises deriving the first signal from an initial portion of the stream of electrical signals, and after the stream of electrical signals ends, deriving a second signal from the stream of electrical signals using the DSP;
   step (f) comprises transmitting the second signal to the microcomputer;
   step (g) comprises deriving a second traffic information signal from the second signal using the microcomputer; and,
   step (h) comprises transmitting the second traffic information signal to the external traffic management system.

3. The method as defined in claim 2 wherein the first signal, the first traffic information signal, the second signal, and the second traffic information signal are generated and transmitted in real time.

4. The method as defined in claim 2 wherein step (e) comprises deriving a final vehicle position from the stream of electrical signals and the second signal includes the final vehicle position.

5. The method as defined in claim 2 wherein
step (f) comprises transmitting the first signal to the microcomputer before the stream of electrical signals ends; and,
step (h) comprises transmitting the first traffic information signal to the external traffic management system before the stream of electrical signals ends.

6. The method as defined in claim 1 wherein
steps (d) and (e) are performed by the DSP at a first clock speed; and
steps (g) and (h) are performed by the microcomputer at a second clock speed, the second clock speed being slower than the first clock speed.

7. The method as defined in claim 2 wherein steps (d), (e) and (f) comprise determining the first signal and transmitting the first signal to the microcomputer while concurrently processing the stream of electrical signals to derive the second signal.

8. The method as defined in claim 2 wherein
step (d) comprises determining a duration of the vehicle; and, the second signal comprises the duration.

9. The method as defined in claim 2 wherein
step (d) comprises determining a vehicle lane for the vehicle detection, and a centricity of the vehicle relative to a center of the vehicle lane; and,
the second signal comprises the centricity of the vehicle.

10. The method as defined in claim 2 wherein the method further comprises, in the microcomputer,
collecting aggregate vehicle data from a plurality of first signals and a plurality of second signals generated for a plurality of vehicles,
establishing a network connection to the external traffic management system, and
configuring the aggregate vehicle data for transmission over the network connection.

11. The method as defined in claim 10 wherein the microcomputer configures the aggegate vehicle data for transmission over the network connection by providing a destination network protocol address for routing the aggregate vehicle data.

12. The method as defined in claim 10 wherein the microcomputer configures the aggregate vehicle data according to the National Transportation Communications for ITS Protocol.

13. A sensor for obtaining vehicular traffic data, the sensor comprising:
an antenna/transceiver module for transmitting microwave radiation at a vehicle passing the sensor and for receiving the microwave radiation reflected back from the vehicle, and for producing a stream of electrical signals based on the microwave radiation reflected back from the vehicle;
a DSP for processing the stream of electrical signals, the DSP having a vehicle detection function for determining a vehicle detection if a vehicle detection threshold is met and for determining a vehicle position, and a signal generation function for generating a first signal representing the vehicle detection and the vehicle position, the signal generation function being linked to the vehicle detection function for communication therewith; and,
a microcomputer for receiving and processing the first signal to derive a first traffic information signal for transmission to an external traffic management system, the microcomputer being electronically coupled to the DSP and having a communication function for electronic communication with an external traffic management system.

14. The sensor as defined in claim 13 wherein
the vehicle detection function is further operable to detect an end of the vehicle passing the sensor, and the signal generation function is further operable to generate a second signal based on the end of the vehicle and to communicate the second signal to the microcomputer; and,
the microcomputer is further operable to receive and process the second signal to derive a second traffic information signal for transmission to the external traffic management system.

15. The sensor as defined in claim 14 wherein
the vehicle detection function is further operable to determine a duration of the vehicle passing the sensor; and,
the second signal comprises the duration.

16. The sensor as defined in claim 14 wherein
the vehicle detection function is further operable to determine a vehicle lane and a center of the vehicle lane for the vehicle detection, and a centricity of the vehicle relative to the center of the vehicle lane; and,
the second signal comprises the centricity of the vehicle.

17. The sensor as defined in claim 14 wherein
the microcomputer further comprises a data compilation function for collecting aggregate vehicle data from a plurality of first signals and a plurality of second signals generated for a plurality of vehicles passing the sensor; and
the communication function is further operable to establish a network connection to the external traffic management system, and to configure the aggregate vehicle data for transmission over the network connection.

18. The sensor as defined in claim 17 wherein the communication function is operable to configure the aggregate vehicle data for transmission over the network connection by providing a destination network protocol address for routing the aggregate vehicle data.

19. The sensor as defined in claim 14 wherein the communication function is operable to configure the aggregate vehicle data according to the National Transportation Communications for ITS Protocol.

20. The sensor as defined in claim 13 wherein the DSP has a first processing speed and the microcomputer has a second processing speed, wherein the second processing speed is substantially slower than the first processing speed.

* * * * *